US009395980B2

(12) United States Patent
Aldrich et al.

(10) Patent No.: US 9,395,980 B2
(45) Date of Patent: *Jul. 19, 2016

(54) RESIDUAL ADDITION FOR VIDEO SOFTWARE TECHNIQUES

(71) Applicant: Intel Corporation, Santa Clara, CA (US)

(72) Inventors: Bradley Aldrich, Austin, TX (US); Nigel Paver, Austin, TX (US); Murli Ganeshan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 467 days.

This patent is subject to a terminal disclaimer.

(21) Appl. No.: 14/052,225

(22) Filed: Oct. 11, 2013

(65) Prior Publication Data

US 2014/0047220 A1    Feb. 13, 2014

Related U.S. Application Data

(63) Continuation of application No. 13/296,759, filed on Nov. 15, 2011, now Pat. No. 8,560,809, which is a continuation of application No. 10/814,312, filed on Mar. 30, 2004, now Pat. No. 8,082,419.

(51) Int. Cl.
| | |
|---|---|
| *G06F 9/30* | (2006.01) |
| *H04N 19/44* | (2014.01) |
| *H04N 19/42* | (2014.01) |
| *H04N 19/43* | (2014.01) |
| *H04N 19/436* | (2014.01) |

(52) U.S. Cl.
CPC .......... *G06F 9/3001* (2013.01); *G06F 9/30036* (2013.01); *H04N 19/42* (2014.11); *H04N 19/43* (2014.11); *H04N 19/436* (2014.11); *H04N 19/44* (2014.11)

(58) Field of Classification Search
None
See application file for complete search history.

(56) References Cited

U.S. PATENT DOCUMENTS

| | | |
|---|---|---|
| 5,065,353 A | 11/1991 | Nojiri et al. |
| 2002/0040378 A1 | 4/2002 | Symes |
| 2002/0065860 A1 | 5/2002 | Grisenthwaite et al. |
| 2002/0083311 A1 | 6/2002 | Paver |
| 2004/0034760 A1 | 2/2004 | Paver |

*Primary Examiner* — John Lindlof
(74) *Attorney, Agent, or Firm* — Vecchia Patent Agent, LLC

(57) ABSTRACT

According to some embodiments, a technique provides for the execution of an instruction that includes receiving residual data of a first image and decoded pixels of a second image, zero-extending a plurality of unsigned data operands of the decoded pixels producing a plurality of unpacked data operands, adding a plurality of signed data operands of the residual data to the plurality of unpacked data operands producing a plurality of signed results; and saturating the plurality of signed results producing a plurality of unsigned results.

23 Claims, 7 Drawing Sheets

RESIDUAL ADDITION FOR VIDEO SOFTWARE TECHNIQUES

The present application is a continuation of U.S. patent application Ser. No. 13/296,759, filed on Nov. 15, 2011, entitled "RESIDUAL ADDITION FOR VIDEO SOFTWARE TECHNIQUES", which is a continuation of U.S. patent application Ser. No. 10/814,312 filed on Mar. 30, 2004, entitled "RESIDUAL ADDITION FOR VIDEO SOFTWARE TECHNIQUES", now U.S. Pat. No. 8,082,419. U.S. Pat. No. 8,082,419 is hereby incorporated herein by reference.

A portion of the disclosure of this patent document contains material that is subject to copyright protection. The copyright owner has no objection to the facsimile reproduction by anyone of the patent disclosure, as it appears in the Patent and Trademark office patent files or records, but otherwise reserves all copyright rights whatsoever.

BACKGROUND

Description of the Related Art

Many processing techniques, for example, image and video processing, include operations in which operands of different sizes and types are added, for example, unsigned data and signed data. These mixed-mode addition operations may be used, for example, in image correlation and estimation where, for example, unsigned pixel values of previously decoded image frames are added to signed residual pixel values. These mixed-mode addition operations may be computationally intensive, for example, requiring significant memory bandwidth and consuming many computing cycles.

In order to support the computational load and data throughput requirements associated with performing a large number of mixed-mode addition operations, processors used for image and video processing may introduce SIMD (Single-Instruction/Multiple-Data) operations. In SIMD operations, a single instruction is sent to a number of processing elements that perform the same operation on different data.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

According to some embodiments, a technique provides for the execution of an instruction that includes receiving residual data of a first image and decoded pixels of a second image, zero-extending a plurality of unsigned data operands of the decoded pixels producing a plurality of unpacked data operands, adding a plurality of signed data operands of the residual data to the plurality of unpacked data operands producing a plurality of signed results; and saturating the plurality of signed results producing a plurality of unsigned results.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
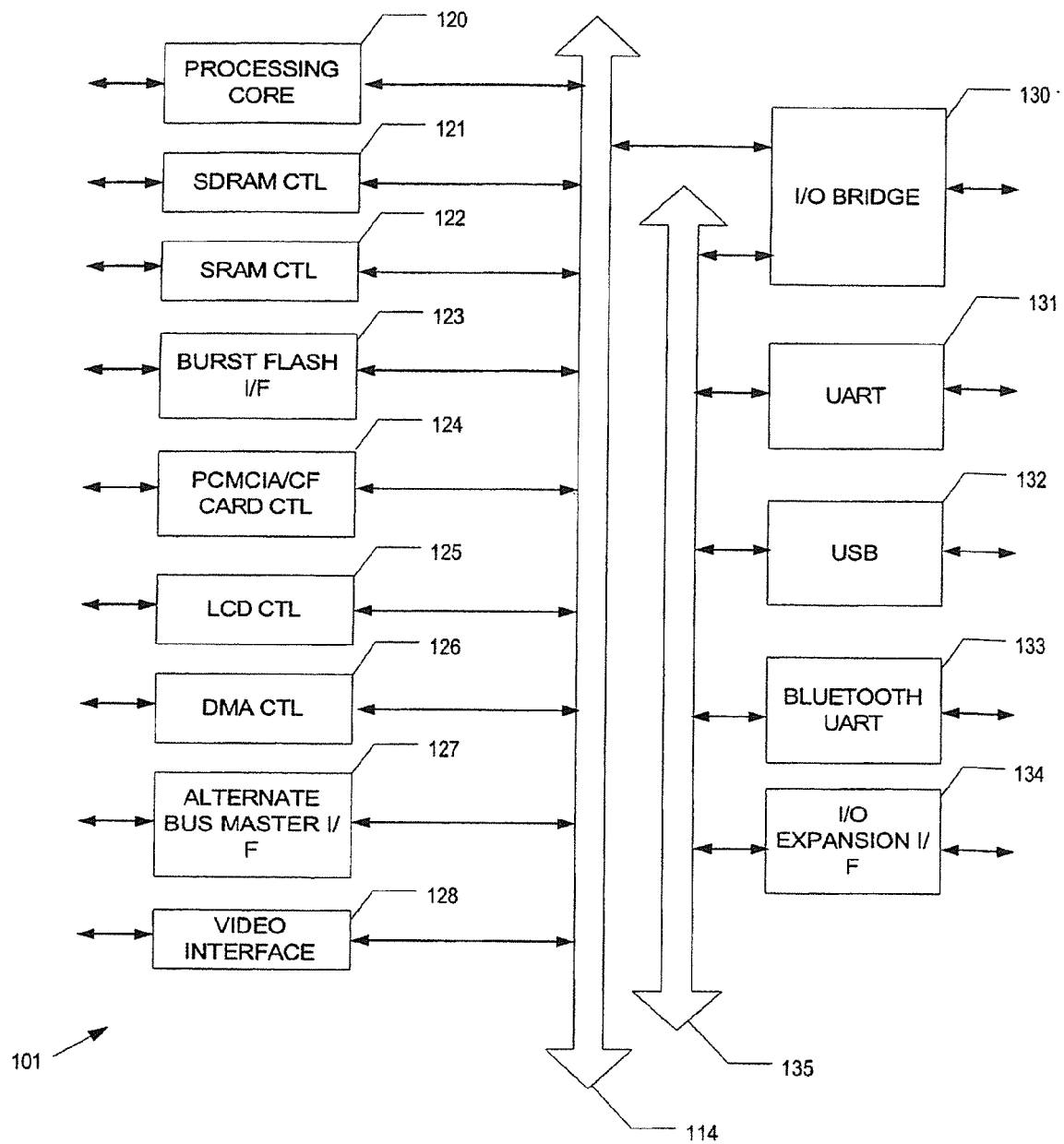
FIG. 1 illustrates a data processing system capable of executing a mixed-mode addition SIMD instruction according to an embodiment of the present invention.

FIG. 1 illustrates a data processing system 101 capable of executing a mixed-mode addition Single Instruction/Multiple Data (SIMD) instruction according to an embodiment of the present invention. The mixed-mode addition instruction performs a mixed-mode addition on byte sized unsigned data and half-word sized signed data and performs an unsigned saturation on the addition results producing packed eight-bit unsigned results. The instruction selectively adds four 8-bit most significant unsigned operands or four 8-bit least significant unsigned operands of a source register to four 16-bit signed operands from another source register and stores four 16-bit signed results in a destination register. One embodiment of data processing system 101 includes an Intel® Personal Internet Client Architecture (Intel® PCA) applications processor with Intel XScale™ technology.

Data processing system 101 may include a processing core 120 capable of performing SIMD operations and, in particular, a mixed-mode addition SIMD instruction. Processing core 120 is coupled with a bus 114 for communicating with various other system devices, which may include but are not limited to, for example, a synchronous dynamic random access memory (SDRAM) controller 121, a static random access memory (SRAM) controller 122, a burst flash memory interface 123, a personal computer memory card international association (PCMCIA)/compact flash (CF) card controller 124, a liquid crystal display (LCD) controller 125, a direct memory access (DMA) controller 126, an alternative bus master interface 127, and a video interface 128.

In one embodiment, data processing system 101 may also comprise an I/O bridge 130 for communicating with various I/O devices via an I/O bus 135. Such I/O devices may include but are not limited to, for example, a universal asynchronous receiver/transmitter (UART) 131, a universal serial bus (USB) 132, a Bluetooth wireless UART 133, and an I/O expansion interface 134.

One embodiment of data processing system 101 provides for mobile, network and/or wireless communications and a processing core 120 capable of performing SIMD operations and in particular, a mixed-mode addition SIMD instruction. Processing core 120 may be programmed with various audio, video, imaging and communications algorithms. It will be appreciated that these algorithms may include digital signal processing (DSP) building blocks, which may benefit from SIMD operations, such as: convolutions; auto-correlation functions (ACF) or cross-correlation functions (CCF); digital filters such as finite impulse response filters (FIR), adaptive filters (AF) which include, for example, least mean squared (LMS) error algorithms for echo cancellation, or infinite impulse response filters (IIR); discrete transformations such as a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 2:
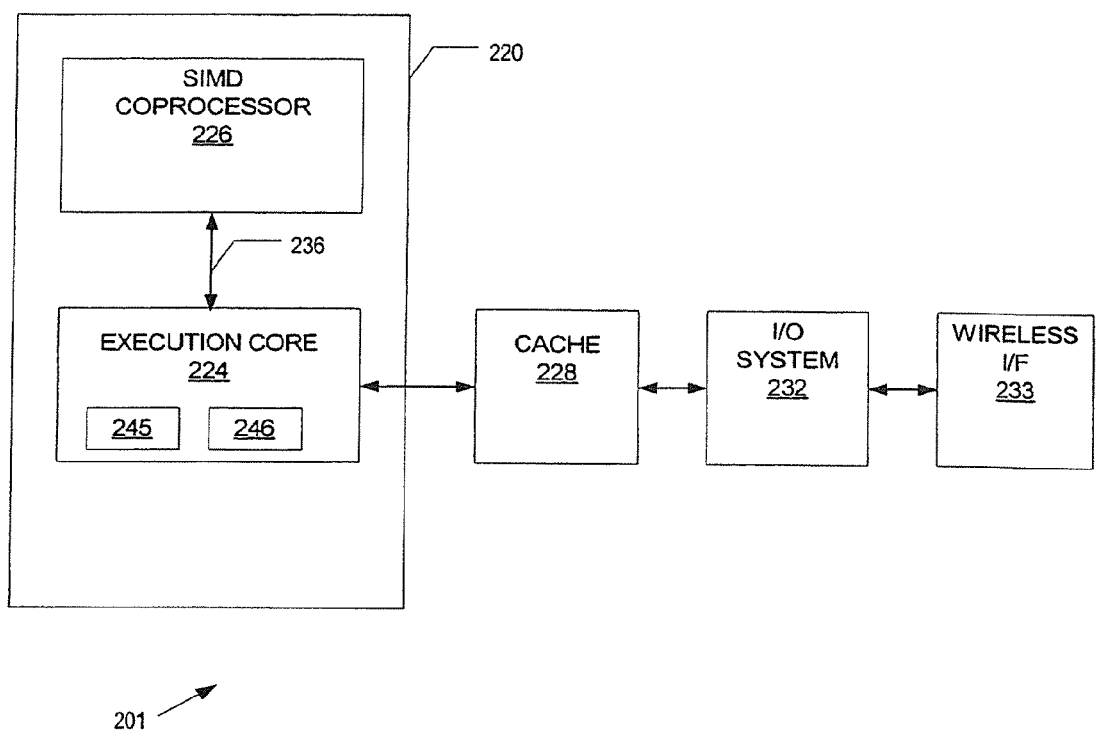
FIG. 2 illustrates an alternative embodiment of a data processing system capable of executing a mixed-mode addition SIMD instruction according to an embodiment of the present invention.

FIG. 2 illustrates an alternative embodiment of a data processing system capable of executing a mixed-mode addition averaging SIMD instruction. A data processing system 201 may include a processing core 220 having an execution core 224 and a SIMD coprocessor 226. Processing core 220 may communicate with a cache memory 228 and an input/output system 232. The input/output system 232 may optionally be coupled to a wireless interface 233. SIMD coprocessor 226 is capable of performing SIMD operations, in particular, a mixed-mode addition SIMD instruction.

In operation, execution core 224 executes a stream of data processing instructions that control data processing operations of a general type including interactions with the cache memory 228, and input/output system 232. Embedded within the stream of data processing instructions are coprocessor instructions. Execution core 224 recognizes these coprocessor instructions as being of a type that should be executed by SIMD coprocessor 226. Accordingly, execution core 224 issues these coprocessor instructions on coprocessor bus 236 from where they are received by any attached coprocessors.

Data may be received via wireless interface 233 for processing by the coprocessor instructions. For one example, voice communication may be received in the form of a digital signal, which may be processed by the coprocessor instructions to regenerate digital audio samples representative of the voice communications. For another example, compressed audio and/or video may be received in the form of a digital bit stream, which may be processed by the coprocessor instructions to regenerate digital audio samples and/or motion video frames.

For one embodiment of processing core 220, instructions may be conditionally executed. Conditionally executed instructions include instructions that have an associated condition that is checked by determining, for example, if flags 245 and 246 match the condition associated with the instruction.

Processing core 120 of FIG. 1 and/or processing core 220 of FIG. 2 may represent central processing units of any type of architecture, including ARM, CISC or RISC type architectures. While one embodiment is described in which the invention is implemented in a single processor computing system, other embodiments of the invention could be implemented in a multi-processor computing system.

Figure 3:
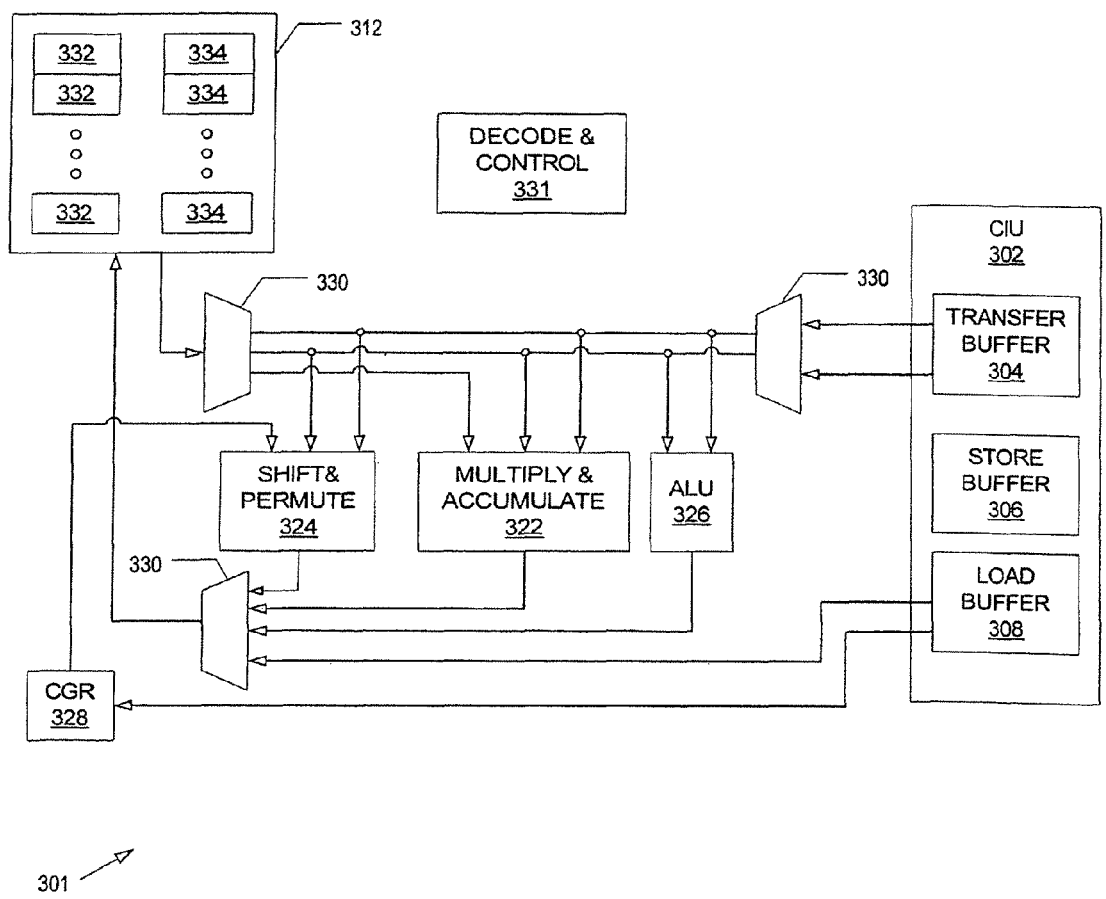
FIG. 3 illustrates a SIMD coprocessor according to an embodiment of the present invention.

FIG. 3 illustrates a SIMD coprocessor according to an embodiment of the present invention. SIMD coprocessor 301 may include a coprocessor interface unit (CIU) 302 including a transfer buffer 304, a store buffer 306 and a load buffer 308. Transfer buffer 304 may facilitate transfers to and from coprocessor register file 312. In one embodiment, as shown, CRT 302 may detect and/or identify coprocessor instructions intended for SIMD coprocessor 301. CIU 302 facilitates communication between an execution core, for example, execution core 224, and coprocessor 301. CIU 302 additionally communicates with a multiply accumulate unit 322, a shift and permute unit 324, and an arithmetic logic unit (ALU) 326. A control general purpose register (CGR) 328 contains auxiliary registers. A plurality of multiplexers 330 facilitates the data transfer between various units. A decode and control unit 331 controls data transfers and processing. In an alternate embodiment, decode and control unit 331 includes microcode.

Coprocessor register file 312 may include a plurality of registers. One embodiment of coprocessor register file 312 includes sixteen data registers 332 and eight status and control registers 334. In one alternative embodiment of coprocessor register file 312, the data registers 332 include 64 bits of data and status and control registers 334 include 32 bits of data. In another alternative embodiment of coprocessor register file 312, data registers 332 include 128 bits of data providing for wide SIMD operations and status and control registers 334 include 64 or more bits of data.

In one embodiment of coprocessor 301, up to three registers may be assigned for each instruction. For example, up to two source registers and one destination register may be assigned or implicit to an instruction. A primary source register may be designated wRn, a secondary source register may be designated wRm, and a destination register may be designated wRd in accordance with one embodiment of coprocessor 301.

Data processing systems 101 and 201 and SIMD coprocessor 301 are well suited for video applications. Video encoding and decoding are computationally intensive applications. Many video coding standards employ a discrete cosine transform (DCT) based motion compensated encoding scheme. Both spatial as well as temporal redundancy in a sequence of images may be exploited to reduce the amount of data which is to be transmitted or stored.

Spatial compression removes redundant data within any given image and is applied to all image data during video compression by applying a DCT operation followed by quantization and Huffman encoding. Temporal compression removes redundant data within a sequence of images by taking advantage of similarity between sequential frames of motion video. Similarity between frames can be used to reduce the amount of transmitted data relieving a high burden on execution resources.

During temporal encoding, component blocks of sequential video frames are compared at displaced positions which represent candidate motion vectors in the horizontal and vertical directions. The task of calculating displacement values, motion estimation, involves finding the best match between corresponding areas within two sequential video frames. The video decoder provides the inverse of the operations the have occurred at the encoder. Because the inverse DCT operation produces signed data and the decoded frames contain unsigned pixel values, both the encoding and decoding processes include a significant amount of mixed-mode addition operations.

The mixed-mode addition SIMD instruction may be performed on, for example, 16-bit signed pixel values from an image currently being decoded and 8-bit unsigned pixel values from an image previously decoded.

The mixed-mode addition SIMD instruction may be implemented using the following format:

WADDBHUS <M, L> {Cond} wRd, wRn, wRm where M, L, and Cond are qualifiers, wRn and wRm are source registers and wRd is a destination register. The wRn register is, for example, a 64-bit register used to store four half-word (16-bit) signed operands. The wRm and the wRd registers are, for example, 64-bit registers used to store eight byte (8-bit) unsigned operands. Only one of the qualifiers M and L is presented and indicates whether the upper or lower four unsigned operands stored in the wRm register are operated on and whether the operation results are stored in the upper or lower half of the wRd register. If M is specified, the upper four 8-bit unsigned operands stored in the wRm register are operated on and the operation results are stored in the upper half of the wRd register. If L is specified, the lower four 8-bit unsigned operands stored in the wRm register are operated on and the operation results are stored in the lower half of the wRd register. The qualifier Cond is an execution condition and is optional. If the condition is present and not true, then the instruction is not executed.

A mixed-mode addition operation may be carried out as follows:

```
if (Cond specified is true) then {
if (M Specified) then{
   wRd[byte 7] = saturate( wRn[half 3] + wRm[byte 7], US, 8 );
   wRd[byte 6] = saturate( wRn[half 2] + wRm[byte 6], US, 8 );
   wRd[byte 5] = saturate( wRn[half 1] + wRm[byte 5], US, 8 );
   wRd[byte 4] = saturate( wRn[half 0] + wRm[byte 4], US, 8 );
   wRd[byte 3] = 0;
   wRd[byte 2] = 0;
   wRd[byte 1] = 0;
   wRd[byte 0] = 0; }
if (L Specified) then{
   wRd[byte 7] = 0;
   wRd[byte 6] = 0;
   wRd[byte 5] = 0;
   wRd[byte 4] = 0;
   wRd[byte 3] = saturate( wRn[half 3] + wRm[byte 3], US, 8 );
   wRd[byte 2] = saturate( wRn[half 2] + wRm[byte 2], US, 8 );
   wRd[byte 1] = saturate( wRn[half 1] + wRm[byte 1], US, 8 );
   wRd[byte 0] = saturate( wRn[half 0] + wRm[byte 0], US, 8 ); } }
```

Figure 4:
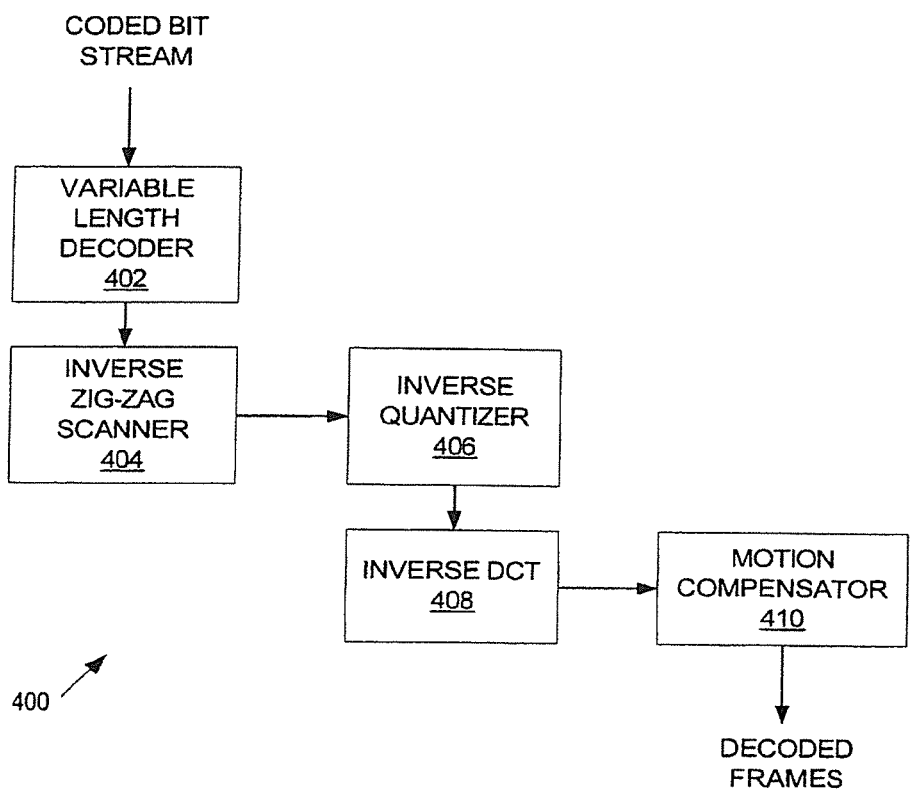
FIG. 4 illustrates a MPEG video decode sequence utilizing a mixed-mode addition SIMD instruction according to an embodiment of the present invention.

FIG. 4 illustrates a MPEG video decode sequence utilizing a mixed-mode addition SIMD instruction according to an embodiment of the present invention. A compressed video stream is provided as input to a video decoder 400. The inverse operations dictated by the intra or predictive coding modes are then performed. If the image has been intra coded, the decompression involves Huffman decoding followed by inverse quantization and an inverse DCT. If the image has been predictive coded, the decoding operations also include motion compensation.

A compressed video stream, that is, a coded bit stream, is received at a variable length decoder 402. After applying a variable length decoding operation, the stream is received at an inverse zig-zag scanner 404 and an inverse quantizer 406 for further decoding. An inverse DCT unit 408 converts the bit stream into residual data. The residual data represents the error difference between the current block and a previously decoded block. The residual data is typically 16-bit signed data. A motion compensator 410 adds the residual data to a selected block of data from a previously decoded frame saturated to 8-bit unsigned limits, 0 to 255, and provides decoded frames to, for example, a frame buffer (not shown) for display.

Figure 5:
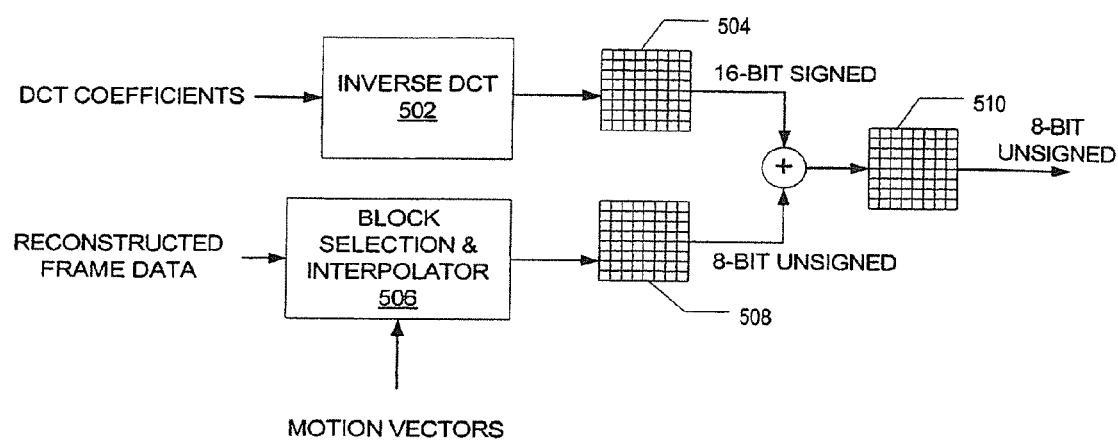
FIG. 5 illustrates a mixed-mode addition step during motion compensation in a video decoder according to an embodiment of the present invention.

FIG. 5 illustrates a mixed-mode addition step during motion compensation in a video decoder according to an embodiment of the present invention. DCT coefficients are received at an inverse DCT unit 502 producing, for example, an 8×8 block of 16-bit unsigned data 504. According to motion vectors, a block selection and interpolator 506 fetches reconstructed frame data in the form of an 8×8 block of 8-bit unsigned data 508. Unsigned data 504 and signed data 508 are added together and reduced to a 8×8 block of 8-bit unsigned data 510.

The addition of 16-bit signed operands with 8-bit unsigned operands requires both a format and precision change for the 8-bit data, the addition of the operands, and the packing of the output data from 16-bit to 8-bit with saturation, or "clipping," to the unsigned limits of 8-bit values. The steps for performing the operation typically include loading 16-bit Signed data operands, for example, produced from an inverse IDCT operation, loading 8-bit unsigned operands, for example, from a previously decoded video frame, converting the 8-bit operands to 16-bit operands, adding the data, saturating the addition results to 8-bit unsigned limits (0 to 255), and storing the 8-bit results for display. According to an embodiment of the present invention, these operations are facilitated with a mixed-mode addition SIMD instruction.

When performing SIMD operations, significant throughput can be achieved if the multiple steps involved in, for example, the residual addition operation can be accomplished in parallel. The mixed-mode SIMD instruction folds multiple operations into a single operation and allows four pixels to be processed simultaneously, selecting the upper or lower half of a 64-bit output as the target for the output results. The final packing of the eight bytes processed through applying the instruction using the upper and lower half options can be accomplished by the OR of these two upper and lower operation results.

Figure 6:
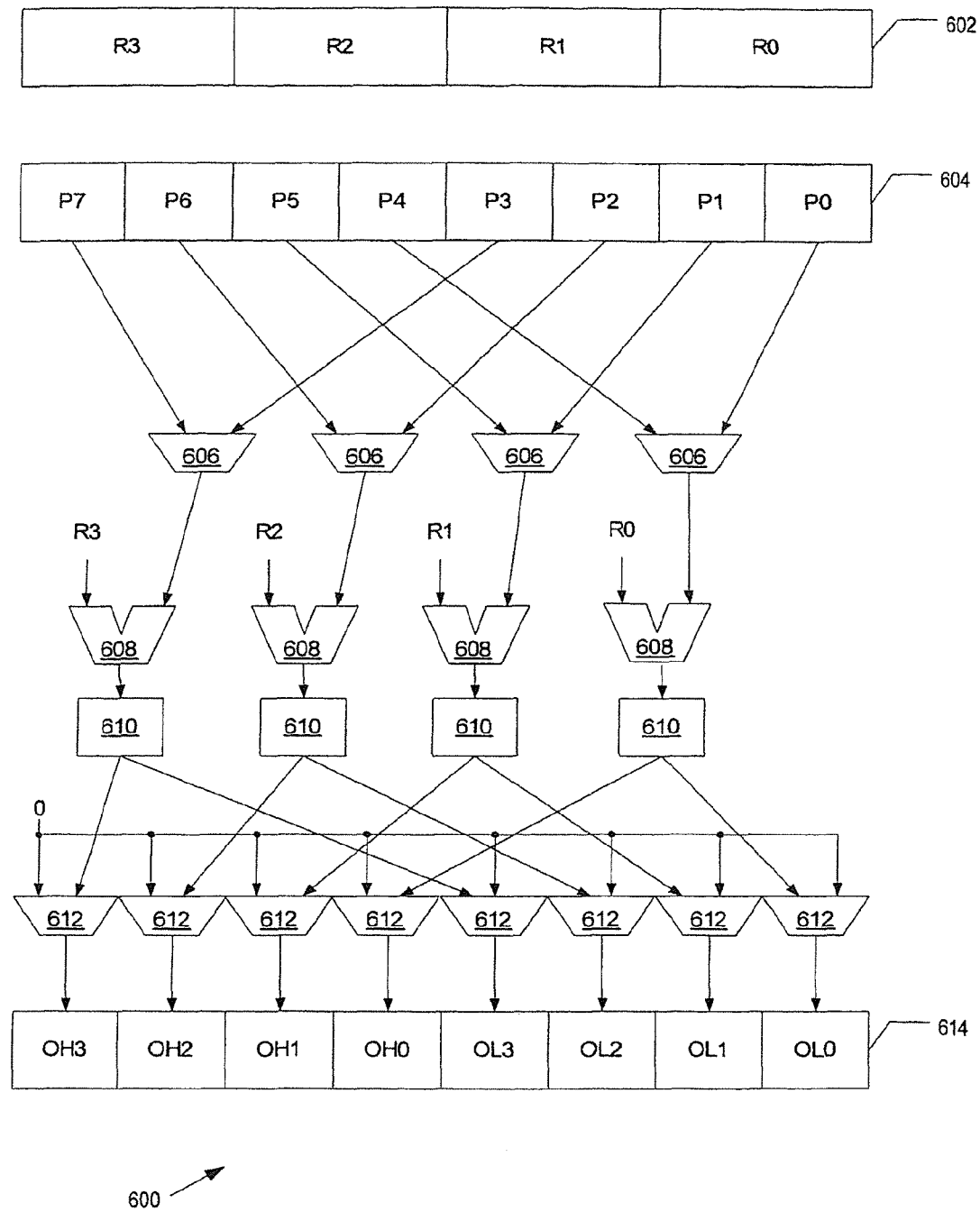
FIG. 6 illustrates a functional unit for performing mixed-mode addition SIMD instruction according to an embodiment of the present invention.

FIG. 6 illustrates a functional unit for performing mixed-mode addition SIMD instruction according to an embodiment of the present invention. The functional unit 600 may be implemented in a processor, for example, processing core 120, processing core 220, SIMD processor 301, a general purpose processor, a digital signal processor (DSP), or an application specific integrated circuit (ASIC) processor.

A set of four 16-bit signed operands, wRn[half 0] to wRn[half 3], shown as R0 to R3, is loaded into a wRn register 602. A set of eight eight-bit operands, wRm[byte 0] to wRm[byte 7], shown as P0 to P7, is loaded into a wRm register 604. Operands P0 to P7 are each routed to one of four multiplexer-and-unpackers 606 and are selected according to the M, L qualifiers. If M is specified, operands P4 to P7 are selected. If L is specified, operands P0 to P3 are selected. The selected operands are unpacked (zero-extended to 16-bits) and each routed to one of four adders 608. R0 to R3 are also each routed to one of four adders 608. Adders 608 are, for example, 16-bit adders. The sum produced by each adder 608 is converted to an eight-bit unsigned operand by saturation units 610. The saturated sums are selected by multiplexers 612 according to the M, L qualifiers. If M is specified, the saturated sums are loaded into the upper four locations of wRd registers 614 and zeroes are loaded into the lower four locations of wRd registers 614. If L is specified, the saturated sums are loaded into the lower four locations of wRd registers 614 and zeroes are loaded into the upper four locations of wRd registers 614.

As illustrated in FIG. 6, four 16-bit adders 608 each add two 16-bit data elements. In other embodiments, the mixed-mode instruction may operate on other data sizes (for example, 32-bit and 64-bit operands) by selecting component functional units and data paths layouts that accommodate the different data size. Also, SIMD instructions that operate on data multiples other than sets of four, as described above in connection with functional unit 600, may also be implemented by selecting component functional units and data path layouts that accommodate the different data multiples.

In one embodiment of the present invention, the use of registers, adders, multiplexers and other units are controlled by microcode or decode logic and may be used by other instructions. This embodiment allows reuse of existing circuitry providing adders, registers and the like to be efficiently reused by other instructions.

Figure 7:
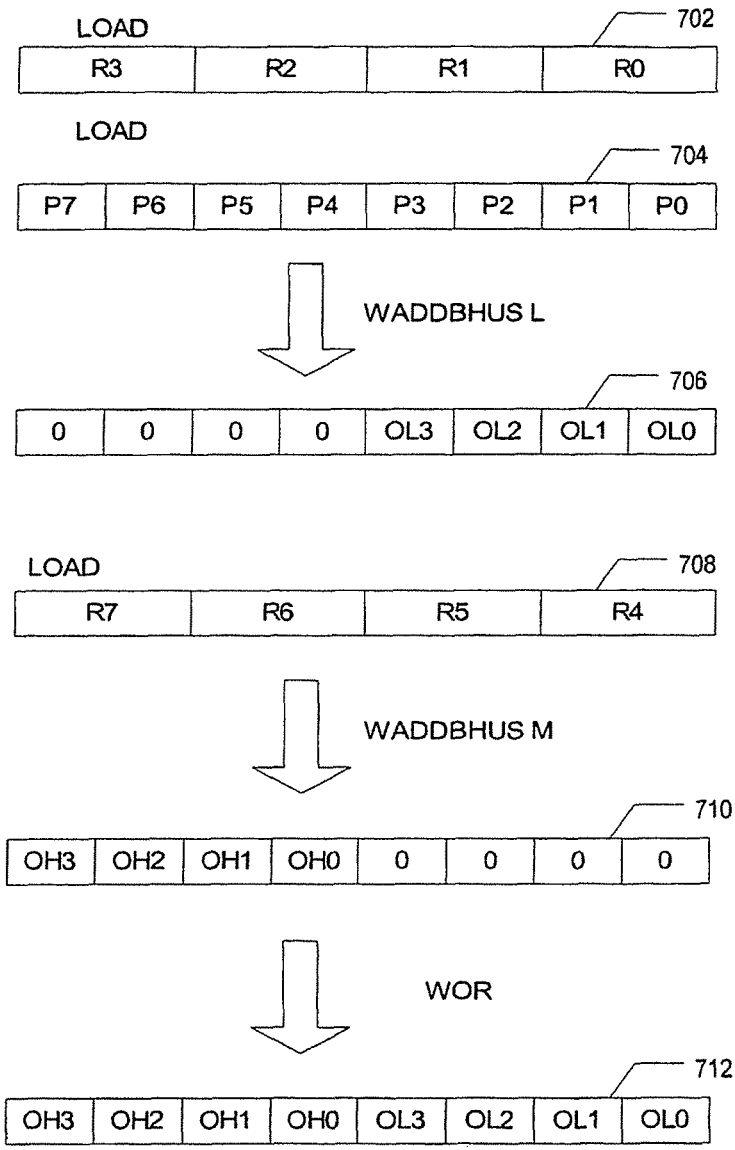
FIG. 7 illustrates a flow diagram of a mixed-mode addition operation according to an embodiment of the present invention.

FIG. 7 illustrates a flow diagram of a mixed-mode addition operation according to an embodiment of the present invention. A set of four 16-bit signed operands, wRn[half 0] to wRn[half 3], shown as R0 to R3, is loaded into a wRn register 702. A set of eight eight-bit operands, wRm[byte 0] to wRm[byte 7], shown as P0 to P7, is loaded into a wRm register 704. A SIMD mixed-mode operation, WADDBHUSL, is performed, adding the operands, R0 to R3, in wRn register 702 to the lower four operands, P0 to P3, in wRm register 704, producing four results OL0 to OL3 loaded into the lower four locations of a wRd register 706 as shown. Zeroes are loaded into the upper four locations of wRd register 706. Another set of four 16-bit signed operands, wRn[half 0] to wRn[half 3], shown as R4 to R7, is loaded into wRn register 708. A SIMD mixed-mode operation, WADDBHUSM, is performed, adding the operands, R4 to R7, in wRn register 708 to the upper four operands, P4 to P7, in wRm register 704, producing four results OH0 to OH3 loaded into the upper four locations of wRd register 710 as shown. Zeroes are loaded into the lower four locations of wRd register 710. An or-ing operation, WOR, or's the values stored in wRd register 706 and wRd register 710 producing the four results OH0 to OH3 loaded into the upper four locations of register 712 and the four results OL0 to OL3 loaded into the lower four locations of register 712.

Note that although separate registers are illustrated for each mixed-mode addition operation, alternate embodiments may reuse source and/or destination registers for multiple operations.

The techniques described above may be embodied in a computer-readable medium for configuring a computing system to execute the method. The computer readable media may be permanently, removably or remotely coupled to system 101, 201 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A processor comprising:
   a plurality of registers; and
   a decode and control unit to receive an instruction, the instruction to indicate a first source register of the plurality of registers and a second source register of the plurality of registers, the first source register to store a first plurality of signed operands of a first precision, the second source register to store a second plurality of unsigned operands of a second precision, the first precision to be greater than the second precision, the first plurality to be less than the second plurality; and
   a functional unit to perform the instruction and to store a plurality of result operands in only one of an upper half and a lower half of a destination register of the plurality of registers, the plurality of result operands to be unsigned operands of the second precision, wherein the plurality of results operands are each to include a sum of a signed operand of the first plurality of signed operands with a corresponding unsigned operand of the second plurality of unsigned operands, the corresponding unsigned operands from only one of an upper half and a lower half of the second source register, wherein the functional unit is not to store sums in another half of the destination register besides said one of the upper and the lower halves used to store the plurality of result operands.

2. The processor of claim 1, wherein the functional unit is to store zeros in said another half of the destination register.

3. The processor of claim 1, wherein the functional unit is operable responsive to the instruction to saturate the result operands to saturation limits of the second precision when the sums would exceed the saturation limits.

4. The processor of claim 1, wherein the instruction has a qualifier to specify that the plurality of result operands are to be stored in said one of the upper half and the lower half of the destination register.

5. The processor of claim 1, wherein the first plurality of signed operands comprises four signed operands, the second plurality of unsigned operands comprises eight unsigned operands, and the plurality of result operands comprise four result operands.

6. The processor of claim 1, wherein the functional unit comprises a plurality of multiplexers to select between unsigned operands from the upper and lower halves of the second source register.

7. A processor comprising:
a plurality of registers;
a unit to receive an instruction, the instruction to indicate a first register of the plurality of registers and a second register of the plurality of registers, the first register to store a first plurality of signed operands of a first precision, the second register to store a second plurality of unsigned operands of a second precision, the second precision half the first precision, and the second plurality twice the first plurality; and
a functional unit to execute the instruction and to store result operands in only a lower half of a destination register, the result operands being unsigned operands of the second precision, the result operands each to represent a sum of a signed operand from the first plurality of signed operands with a corresponding unsigned operand from the second plurality of unsigned operands, the corresponding unsigned operands from the second plurality of unsigned operands to comprise operands from only a lower half of the second register.

8. The processor of claim 7, wherein the functional unit is to store zeros in an upper half of the destination register.

9. The processor of claim 7, wherein the functional unit is operable responsive to the instruction to saturate the result operands.

10. The processor of claim 7, wherein the instruction has a qualifier to specify that the result operands are to be stored in the lower half of the destination register.

11. The processor of claim 7, wherein the first plurality of signed operands comprises four signed operands, wherein the second plurality of unsigned operands comprises eight unsigned operands, and wherein the result operands comprise four result operands.

12. The processor of claim 7, wherein the first precision is 16-bits and the second precision is 8-bits.

13. The processor of claim 7, wherein the functional unit comprises a plurality of multiplexers to select between unsigned operands from the upper and lower halves of the second register.

14. A processor comprising:
a plurality of registers;
a unit to receive an instruction, the instruction to indicate a first register of the plurality of registers and a second register of the plurality of registers, the first register to store a first plurality of operands of a first precision, the second register to store a second plurality of operands of a second precision, the second precision half the first precision, and the second plurality twice the first plurality; and
a functional unit to execute the instruction and to store a plurality of result operands equal in number to the first plurality of operands in only one of an upper half and a lower half of a destination register, the plurality of result operands being of the second precision, the plurality of result operands each to include a sum of an operand from the first plurality of operands with a corresponding operand of the second plurality of operands from only one of an upper half and a lower half of the second register saturated when appropriate to limits of the second precision.

15. The processor of claim 14, wherein the functional unit is to store zeros in another half of the destination register not used to store the plurality of result operands.

16. The processor of claim 14, wherein the instruction has a qualifier to specify said one of the upper half and the lower half of the destination register to be used to store the result operands.

17. The processor of claim 14, wherein the instruction is to indicate that said one of the upper half and the lower half of the destination register to be used to store the result operands.

18. The processor of claim 14, wherein the first plurality of operands are signed operands, the second plurality of operands are unsigned operands, and the result operands are unsigned operands.

19. The processor of claim 14, wherein the first plurality of signed operands comprises four signed operands, wherein the second plurality of unsigned operands comprises eight unsigned operands, and wherein the result operands comprise four result operands.

20. The processor of claim 14, wherein the first precision is 16-bits and the second precision is 8-bits.

21. A system comprising:
a bus;
a wireless interface coupled with the bus to received data; and
a processor coupled with the bus, the processor to process the data received from the wireless interface, the processor comprising:
a plurality of registers;
a unit to receive an instruction, the instruction to indicate a first register of the plurality of registers and a second register of the plurality of registers, the first register to store a first plurality of operands of a first precision, the second register to store a second plurality of operands of a second precision, the second precision half the first precision, and the second plurality twice the first plurality; and
a functional unit to execute the instruction and to store a plurality of result operands equal in number to the first plurality of operands in only one of an upper half and a lower half of a destination register, the plurality of result operands being of the second precision, the plurality of result operands each to include a sum of an operand from the first plurality of operands with a corresponding operand of the second plurality of operands from only one of an upper half and a lower half of the second register saturated when appropriate to limits of the second precision.

22. The system of claim 21, wherein the functional unit is to store zeros in another half of the destination register not used to store the plurality of result operands.

23. The system of claim 21, wherein the instruction has a qualifier to specify said one of the upper half and the lower half of the destination register to be used to store the result operands.

* * * * *